Sept. 22, 1942.  T. BARISH  2,296,327
CONTAINER
Filed Oct. 23, 1940

Thomas Barish
INVENTOR

BY Brown+Jones
ATTORNEYS

Patented Sept. 22, 1942

2,296,327

UNITED STATES PATENT OFFICE 2,296,327

CONTAINER

Thomas Barish, Jamestown, N. Y.

Application October 23, 1940, Serial No. 362,353

10 Claims. (Cl. 62—108.5)

This invention relates to containers and more specifically to containers in which a liquid is to be solidified.

In general, it is an object of the invention to provide a device of the character described, which will efficiently perform the purposes for which it is intended, which is simple and economical of construction, which can be expeditiously, conveniently and safely manipulated, and which can be readily manufactured and assembled.

Another object of the invention is to provide a container which automatically separates itself from material which has been frozen therein by expanding away from the frozen material and/or by pushing the frozen material away from itself and which so acts at temperatures below the freezing point.

Another object is to provide a container, in which fluid material may become frozen, and which will grip the frozen material more tightly, on account of the construction described below, than it otherwise would.

Other objects of the invention will in part be obvious and will in part appear hereinafter.

The invention accordingly comprises the features of construction, combination of elements, and arrangement of parts, which will be exemplified in the product hereinafter described and the scope of the application of which will be indicated in the claims.

For a fuller understanding of the nature and objects of the invention reference should be had to the following detailed description taken in connection with the accompanying drawing, in which.

Figure 1:
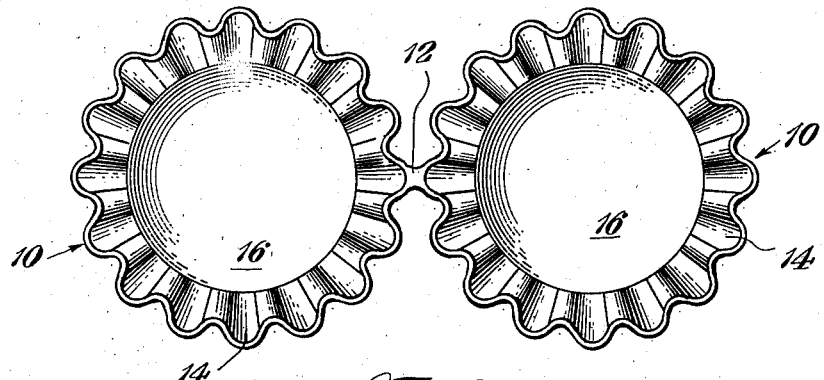
Fig. 1 is a plan view of a device embodying one form of the invention.

When water freezes it expands in volume by about eight percent. Depending upon circumstances the container, in which the water is frozen, is caused by the freezing of the water to expand, more or less. This may occur even though the container is not in contact with the entire surface of the water. It has been known that corrugated material in the walls of a container would spread sufficiently to avoid rupture while the water was being solidified therein. Nevertheless, such walls were constantly under the direct mechanical stress imposed by the freezing material.

It is usual for temperatures to be maintained at a degree at least slightly below the freezing point in the region of a container the contents of which it is desired to keep in the frozen state. During freezing the temperature of a container generally remains at the freezing temperature. Then the ice and the container go down in temperature to the temperature of the surroundings. During this last physical process the container grips the ice harder and harder because the coefficient of contraction of the container, if it is a common metal, is greater than the coefficient of contraction for ice for temperatures below 0° C. Since it is convenient or necessary to use the frozen material at a point spaced from the container the disadvantages of having the former wedged tightly into the latter are obvious.

The present invention contemplates a device which avoids the difficulties and drawbacks just referred to. This new device automatically separates itself from the ices or other substances, once the latter has been frozen therein and with the proper arrangement of parts actually expels the frozen mass out of itself.

In the drawing 10 denotes a container which may have any convenient general dimensions but which is shown as cup shape. There may be a plurality of containers 10 connected together to give a more or less rigid structure. The connection may be at any suitable points but it should not interfere with the expansion and contraction of the container as described below. The vertical web 12 extending between the side walls of two containers illustrates such a connection.

Figure 2:
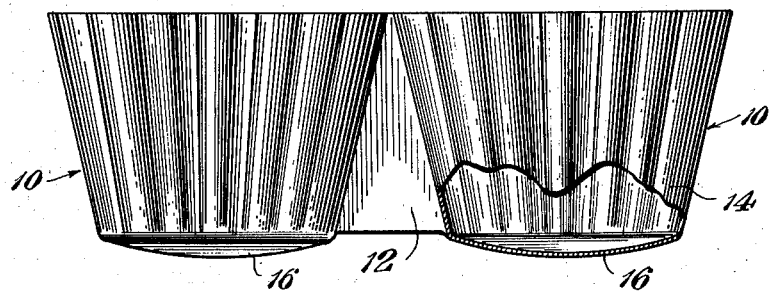
Fig. 2 is a view in elevation of the device shown in Fig. 1.

The side wall 14 of a container, preferably corrugated, is shown generally in Figs. 1 and 2. There may be one or more corrugations. Often the entire wall is corrugated. Each corrugation may extend axially in any direction. They may, for example, extend longitudinally in a direction parallel to the floor 16 or, as shown, they may be perpendicular to a rim or edge.

The wall 14, at least in part, is laminated of a pair of materials which have different coefficients of expansion. The arrangement of the laminations is such that the material 18 with the higher coefficient of expansion is on the convex side of each bead in the corrugations for those structures in which it is desired that the wall separate from the solidified material therein.

"Outside" and "inside" herein refer to the container. Hence material 18 is on the outside of the crests and on the inside of the troughs when the crests and troughs are both determined by a view taken from outside the container.

The laminating of the materials may be in any manner. The material 20 with the lower coefficient of expansion may be corrugated in a sheet of sufficient size to form the entire wall 14 and strips of material 18 may be applied to the convex surfaces of material 20. Copper has been found satisfactory for the material with the higher coefficient. A nickel steel alloy known as "invar" may be used for less expanding material. Other materials may be used, the difference between the coefficients being the important feature.

Figure 4:
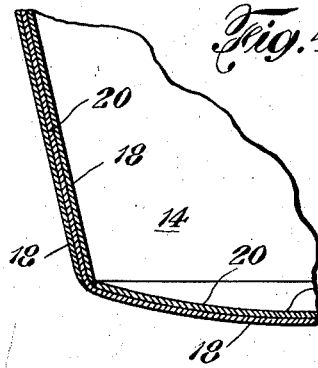
Fig. 4 is an enlarged section of a portion of the floor and side wall of the device of Figs. 1-3, the wall section being taken along the line A—A of Fig. 3.

The floor 16 shown generally in Fig. 2 and in detail in Fig. 4 is laminated and preferably is convex outward, for temperatures above the freezing point of the material to be frozen, and has the more expansive metal on the outside.

The operation of the device is as follows: A fluid such as water is placed within the container and the temperature of the surrounding media brought to a temperature below the freezing point of the fluid—in this case to a reading less than 0° C. As the water freezes it expands about eight percent and depending upon the general configuration of the container, the rate of freezing of the fluid, the smoothness and the thickness of the walls, the number of corrugations, etc., the container itself will be forced to expand by an amount which may be roughly as much as one half of one percent or one percent or even more.

After the liquid has been all frozen, its temperature and the temperature of the container begin to fall toward the temperature of the surroundings. The bimetallic, laminated bends in the wall 14 straighten out by the forces set up within themselves by the change in temperature. Thus the container increases in size, and they separate themselves away from the ice resting on the floor of the container. This separation is increased by the fact that at the same time the frozen material is contracting—ice formed from pure water, for example, at temperatures immediately below 0° C. has a cubical coefficient of 0.000153. A vessel made with the design shown in the drawing and with the materials named, gives an increase in volume of about 0.06% per degree centigrade below 0° C.

If the bind due to the freezing has not stretched the container beyond the elastic limit of its material, the temperature of the container must be depressed sufficiently below the freezing point to release that bind arising from the stretch of the container by the one half percent, say, mentioned above. The amount of temperature drop necessary to release the ice may be determined from the coefficients of expansion of the ice and the container as a whole taken in connection with the freezing stretch. The volume increase of the container of 0.06% per degree and the volume decrease of the ice of 0.015% per degree make a relative change in size of 0.075% per degree. A drop in temperature to about 7° below freezing liberates the ice under these conditions where there has been a bind on freezing of about 0.50%.

After the temperature of the container begins to fall below the freezing point the bimetallic floor changes from convex outward to concave outward, or at least becomes less convex outward. This automatically pushes the ice toward the top of the container and assists in the separation of the ice from the side walls. In certain cases the ice may be automatically entirely expelled.

The material with the higher coefficient of expansion may be placed only on the outside or only on the inside of the container.

The invention is not limited to the freezing of water, but is applicable to other fluids at other temperatures and with bi-metallic materials and coefficients of expansion suitable for the varying condition introduced by the freezing of materials other than water.

Although the increase of cubic contents, with decrease of temperature, has been referred to principally above, it is intended that the present disclosure includes as well the decrease of cubic contents with increase of temperature.

Figure 3:
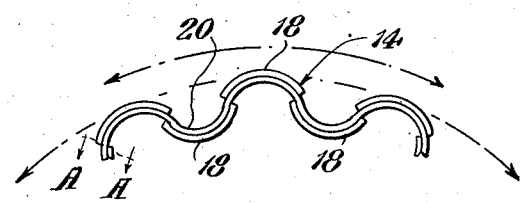
Fig. 3 is an enlarged end view of a portion of the side wall of the device shown in Figs. 1 and 2.

In some instances it is desirable to have a container grip firmly material frozen therein so that the container and material may be used or transported together. In that event the material having the higher coefficient of expansion is placed on the concave side of the bends which form the corrugations and the inner concave side of the floor. The shape of such a container may be the same as that shown in Fig. 3, the material 20 in this instance having a higher coefficient of expansion than material 18.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A container from which may be easily removed a substance which has been frozen therein, said container being formed at least in part of two materials laminated together, said materials having different coefficients of expansion and having a position relative to each other such that as the temperature of said container is lowered the volume thereof is increased.

2. A container from which may be easily removed a substance which has been frozen therein, said container comprising a side wall formed at least in part of two materials laminated together, said materials having different coefficients of expansion, the laminated part of said wall being corrugated.

3. A container from which may be easily removed a substance which has been frozen therein, said container comprising a side wall formed at least in part of two materials laminated together, said materials having different coefficients of expansion, the laminated part of said wall being corrugated, the material having the larger coefficient of expansion being on the outside of those corrugations which appear from the outside as crests and the material having the smaller coefficient of expansion being on the outside of those corrugations which appear from the outside as troughs.

4. A container from which may be easily removed a substance which has been frozen therein, said container comprising a side wall having a corrugation therein, said corrugation comprising two materials laminated together, said materials having different coefficients of expansion, at least a portion of the material having the larger coefficient of expansion being on the outside of the other of said materials and said outside material being only on the crest of said corrugation as seen from the outside.

5. A container from which may be easily removed a substance which has been frozen therein, said container comprising a side wall having a corrugation therein, said corrugation comprising two materials laminated together, a portion of said materials having different coefficients of expansion, the material having the larger coefficient of expansion being on the outside of the other of said materials, said portion being on the crest of said corrugation as seen from the outside and another portion of the material with the larger coefficient being on the inside of the other of said materials when said materials from the trough of said corrugation as seen from the outside.

6. A container comprising a side wall having a corrugation therein, said corrugation comprising two materials laminated together, said materials having different coefficients of expansion, at least a portion of the material having the larger coefficient of expansion being on the inside of the other of said materials said outside material being only on the trough of said corrugation as seen from the outside.

7. A container from which may be easily removed a substance which has been frozen therein, said container comprising a side wall formed at least in part of two materials laminated together, said materials having different coefficients of expansion, said materials being so positioned relative to each other that as their temperatures decrease the volume of said container increases.

8. A container from which may be easily removed a substance which has been frozen therein, said container comprising a side wall formed at least part of two materials laminated together, said materials having different coefficients of expansion, said materials being so positioned relative to each other that as their temperatures decrease the volume of said container decreases at a greater rate than it would if said wall were composed entirely of the one of said two materials having the larger coefficient of expansion.

9. A device of the character described and comprising a plurality of containers from which may be easily removed a substance which has been frozen therein each of said containers comprising a floor and a side wall, each of said floors and walls being formed at least in part of two materials laminated together, said materials having different coefficients of expansion, and means connecting said containers to each other and permitting the expansion and contraction of said materials.

10. A container from which may be easily removed a substance which has been frozen therein, said container comprising a floor which has a periphery and which changes shape upon a temperature decrease so that said periphery expands, and a side wall attached to said periphery and adapted to expand upon a decrease in temperature to permit the expansion of said periphery.

THOMAS BARISH.